UNITED STATES PATENT OFFICE.

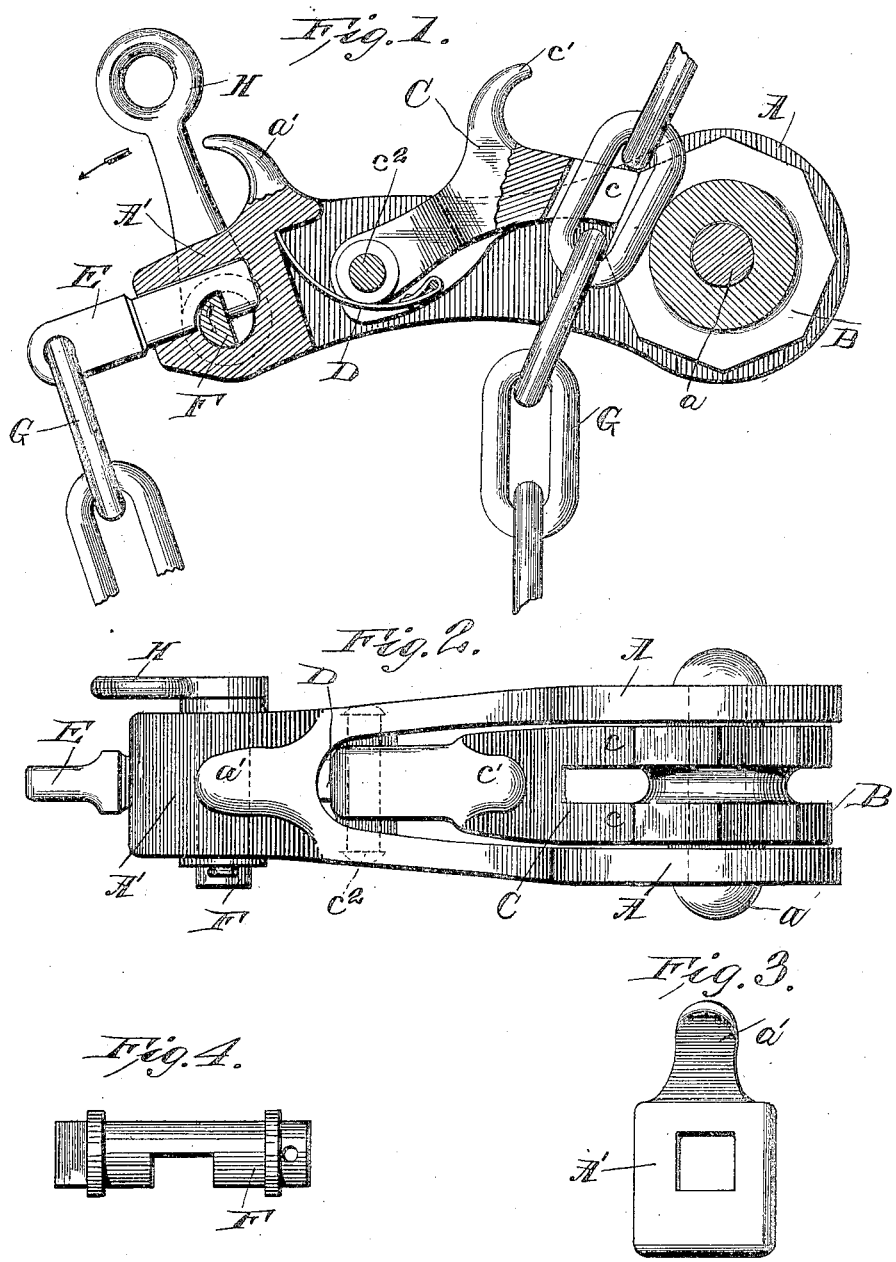

WILLIAM EDWIN CAGE, OF HOHEN SOLMS, LOUISIANA.

CHAIN SLING AND TRIP.

No. 813,277.      Specification of Letters Patent.      Patented Feb. 20, 1906.

Application filed August 17, 1905. Serial No. 274,530.

*To all whom it may concern:*

Be it known that I, WILLIAM EDWIN CAGE, a citizen of the United States, residing at Hohen Solms, in the parish of Ascension and State of Louisiana, have invented a new and useful Improvement in Chain Slings and Trips, of which the following is a specification.

The object of my invention is to provide a chain sling and tripping device for handling bulky and heavy masses of cane and other like material in its transfer from carts to cars or from barges to cars or carts or for storing purposes. It is so designed as to permit the load to be drawn closely together and hold it firmly and yet be easily released when it is desired to do so.

It consists in the novel construction and arrangement of parts, which I will now proceed to describe with reference to the drawings, in which—

Figure 1 is a longitudinal section; Fig. 2, a top plan view, and Figs. 3 and 4 are details.

In the drawings, A represents a metal framework which is made bifurcated at one end, the two sides being integrally joined at the other end, as seen at A'.

B is a metal wheel having two polygonal flanges with a deep groove between them, which wheel is mounted to revolve between the two sides of the frame at one end upon an axial bolt $a$, securely fastened in said sides.

C is a metal detent pivoted between the two sides of the frame upon an axial bolt $c^2$ near the middle of this frame. This detent has two jaws $c\ c$, which trend outwardly from the center and rest against the polygonal faces of the two flanges of the wheel B, the space between the two jaws of the detent being in the same plane with the groove between the two flanges of the polygonal wheel, as seen in Fig. 2. On the upper side of the detent is formed a curved hook or spur $c'$, and to the lower side of the detent is secured a flat spring D, which extends back of the detent and has a bearing in a recess in the frame. This spring tends to hold the jaws $c$ of the detent against the wheel B with an elastic pressure.

The end A' of the frame is formed with a square socket, as seen in Fig. 3, and this socket is adapted to receive the squared shank of a detachable and longitudinally-sliding locking-bolt E. This locking-bolt has a quarter-round notch on its under side to receive a portion of a transverse rotary locking-pin F. Intersecting the square socket of the locking-bolt at right angles is a transverse hole a little below the middle line of the locking-bolt, and this hole forms a bearing in which rotates the locking-pin F. This locking-pin (see Fig. 4) has one-half of its middle part cut away, so as to leave at this point a semicircular cross-section, as seen in Fig. 1, and one-half of this semicircular cross-section is adapted to lock into the quarter-round notch of the bolt E and hold it in its socket in the frame; but when this rotary locking-pin is turned a quarter of a revolution in the direction of the arrow in Fig. 1 its middle part is removed from the quarter-round notch of the bolt and the latter is free to come out of the socket. The rotary locking-pin F has at one end a squared end and a fixed collar and at the other end has a washer secured by a split pin to hold it in its bearings in the frame in a freely-swiveling manner. On the squared end of this rotary locking-pin is secured a trip-arm H, with an eye in its end into which a trip-rope is to be secured.

The operation of my chain sling and trip is as follows: A chain G long enough to pass around the load of cane or other material has one end secured in the eye of the locking-bolt E, and after forming the bight or loop around the load of cane its free end is extended up between the two sides of the frame, as seen in Fig. 1. One of the links of the chain lies partly in the groove between the two flanges of wheel B and partly between the two jaws $c\ c$ of the detent. Now as the jaws $c\ c$ of the detent rest firmly by the tension of spring D against the flat faces of the wheel it will be seen that the next link above will occupy a plane at right angles to the one just mentioned and will be caught upon the upper ends of the two jaws, and the chain will be prevented from pulling down, and the detent C will be more tightly held against the wheel by the weight of the load. It will be seen that by pulling the chain up through the frame the detent C will rise against its spring and allow the chain to pass up and yet at every link the downward movement of the chain is arrested and the chain locked by the cross-link immediately above. This grab connection permits the chain to be taken up to tightly bind the load and to form a loop or bight around the same of any desired size. The other end of the chain forming the loop will be held by the locking-bolt E so long as the latter is locked by the rotary pin F in the position shown in Fig. 1. If, however, the trip-arm H is drawn down or allowed to fall by slackening the trip-rope, the pin F turns a quarter of a revolution, and its cross-section in passing out of the notch in the locking-bolt E allows the latter to pull out from the weight of the load and dump the latter.

The two prongs or spurs $a'$ $c'$ form handholds by which the detent may be manipulated in adjusting the chain and also form a hitch for the trip-rope to hold the arm H to its locking position.

Having thus described my invention, what I claim as new, and desire to secure by Letters Patent, is—

1. A sling and trip comprising a frame having a socket in one end, a longitudinally-movable locking-bolt having a notched end fitting in said socket, a transverse and rotary adjustable locking-pin having its middle portion formed to enter or withdraw from the notch by a rotary action, a flexible connection secured to the locking-bolt, and a take-up grab at the other end of the frame for the other end of the flexible connection.

2. A chain sling and trip comprising a frame having a socket in one end, a longitudinally-moving locking-bolt having a notched end fitting in said socket, a transverse and rotary adjustable locking-pin having its middle portion formed to enter or withdraw from the notch by a rotary action, a chain secured to the locking-bolt, and a chain-grab at the other end of the frame consisting of a wheel with two polygonal flanges with a groove between them and a pivoted detent having two jaws at its free end bearing against the polygonal faces of the wheel and lying upon opposite sides of the groove of said wheel.

3. A chain sling and trip, comprising a two-sided frame, a wheel pivoted between the sides and having two polygonal flanges with a groove between them, a detent pivoted between the two sides of the frame and having two jaws resting upon the polygonal faces of the wheel-flanges and a locking and tripping device at the other end of the frame.

4. A chain sling and trip, comprising a two-sided frame, a wheel pivoted between the sides and having two polygonal flanges with a groove between them, a detent pivoted between the sides of the frame and having two jaws resting upon the polygonal faces of the wheel-flanges, a spring arranged in the frame and bearing against the detent to hold it upon the wheel and a locking and tripping device at the other end of the frame.

5. A chain sling and trip, comprising a two-sided frame, a chain-grab device arranged between the two sides of the frame at one end, a chain, a longitudinally-sliding locking-bolt attached to said chain and entering the end of the frame, a transverse locking-pin for the bolt and a trip-arm on the end of the locking-pin.

6. A chain sling and trip, comprising a frame bifurcated at one end and made integral at the other end with an end-socket, a grooved and polygonal flanged wheel and a pivoted and double-jawed detent arranged between the sides of the bifurcated frame, a spring for the detent, a longitudinally-sliding and notched locking-bolt fitting the end socket of the frame, a transverse locking-pin with trip-arm on its end and a chain connected to the locking-bolt and adjustably secured by the detent and wheel.

WILLIAM EDWIN CAGE.

Witnesses:
G. B. REUP,
THEO. J. DUHON.